UNITED STATES PATENT OFFICE.

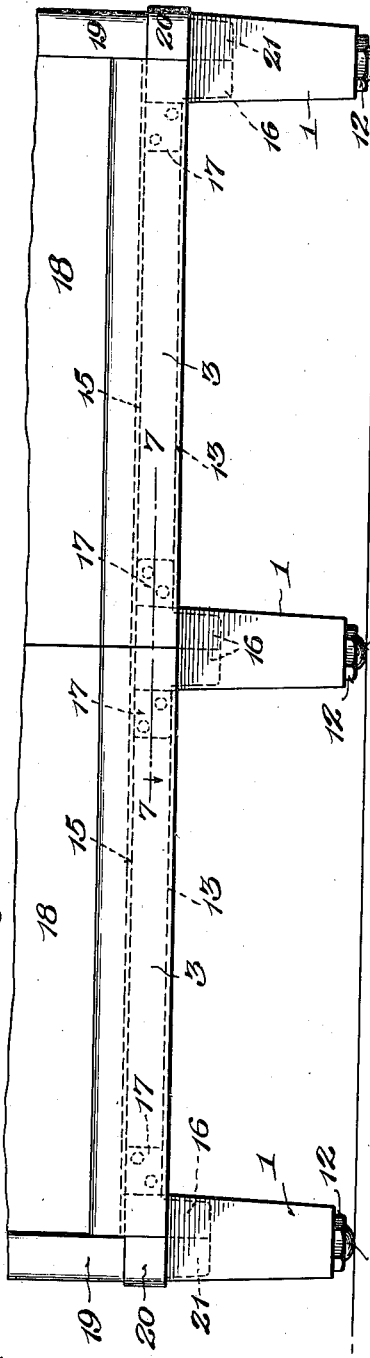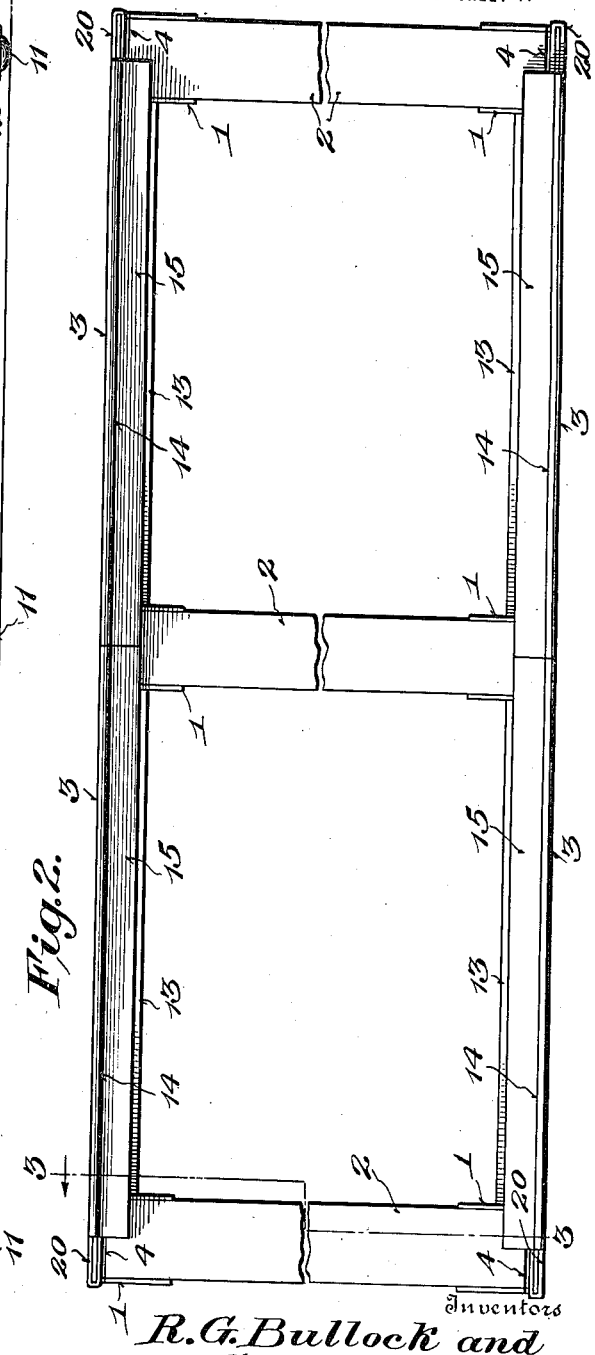

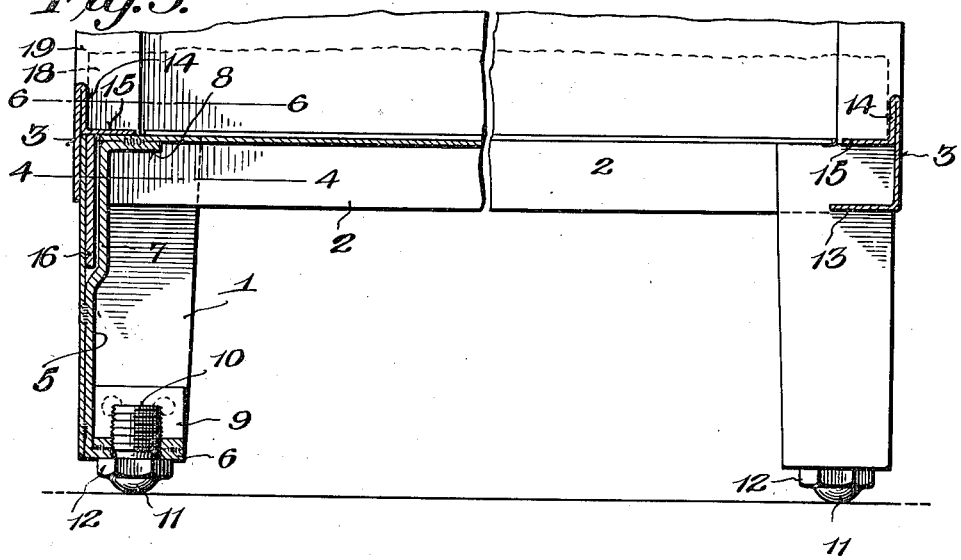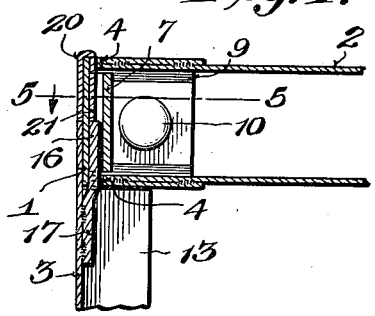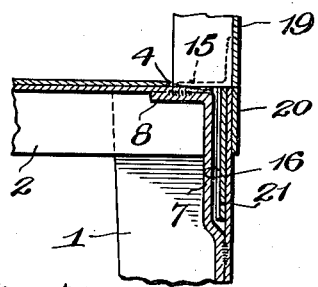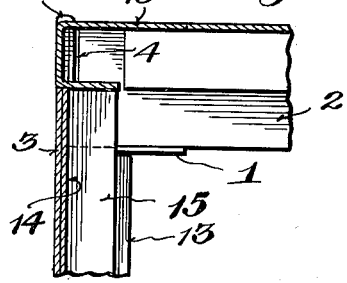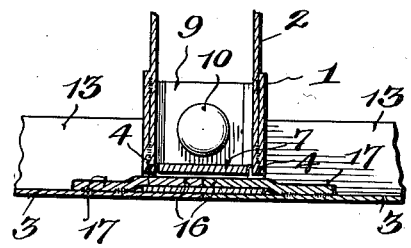

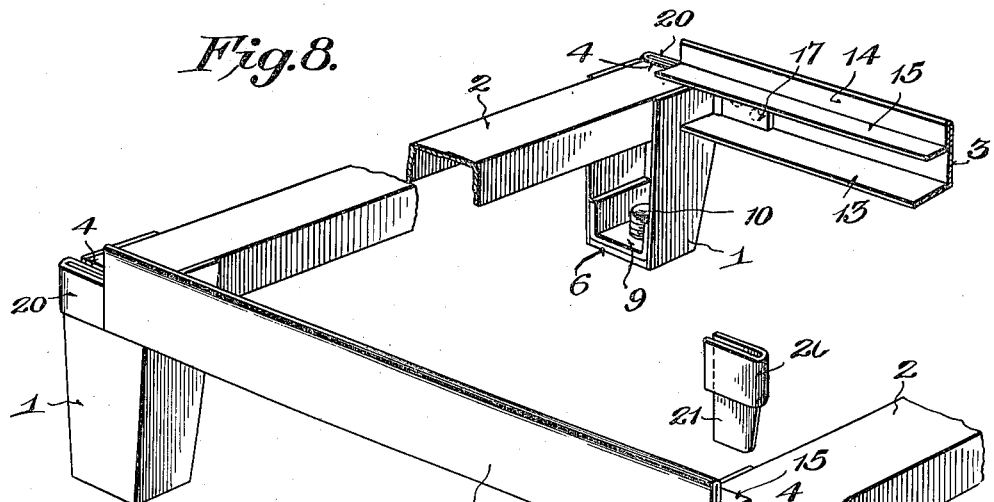
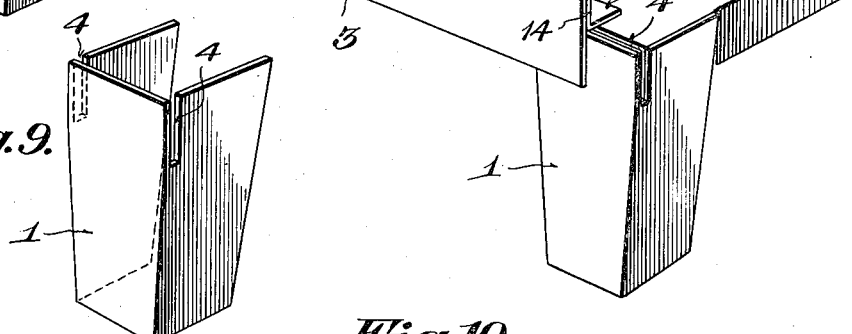
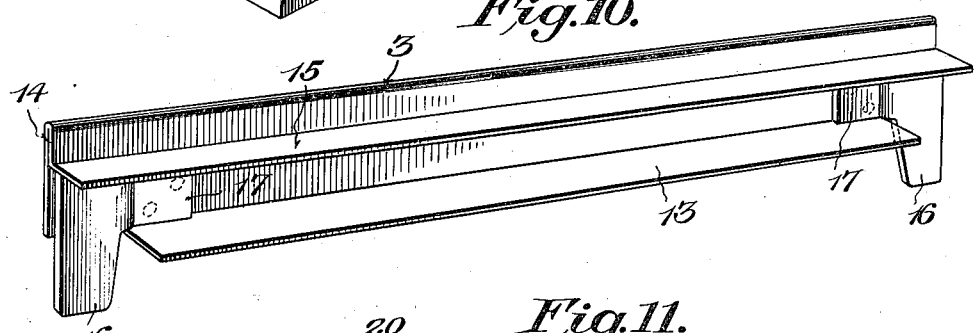
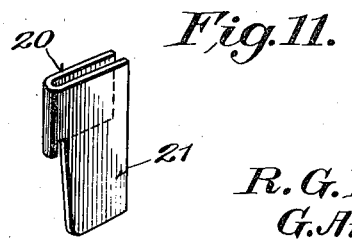

RAYMOND G. BULLOCK AND GEORGE ANDERSON, OF JAMESTOWN, NEW YORK, ASSIGNORS TO THE ART METAL CONSTRUCTION COMPANY, OF JAMESTOWN, NEW YORK, A CORPORATION OF MASSACHUSETTS.

BASE FOR FILING-CABINETS, FURNITURE, &c.

1,310,322.　　　　　Specification of Letters Patent.　　Patented July 15, 1919.

Application filed December 17, 1917. Serial No. 207,528.

*To all whom it may concern:*

Be it known that we, RAYMOND G. BULLOCK and GEORGE ANDERSON, citizens of the United States, residing at Jamestown, in the county of Chautauqua and State of New York, have invented new and useful Improvements in Bases for Filing-Cabinets, Furniture, &c., of which the following is a specification.

This invention relates to bases for filing cabinets, furniture and the like, and has for one of its objects to provide a knock-down structure capable of being quickly assembled into a rigid and durable structure without the employment of bolts, nuts or other extraneous fastenings, and without requiring the use of any special tools.

It is a further object of the invention to provide for the convenient disconnection of the parts of the device, in order that they may be folded together in compact form for transportation and storage.

The present base includes a rectangular frame made up of side bars and leg members, thereby providing a base of the so-called "sanitary" type.

It is a further object of the invention to provide for the convenient extension of the base so as to accommodate a plurality of vertical filing cabinets or the like placed side by side, and to have the base present an attractive and ornamental appearance.

With these and other objects in view, the present invention consists in the combination and arrangement of parts as will be hereinafter more fully described, shown in the accompanying drawings, and particularly pointed out in the appended claims, it of course being understood that changes may be made in the form, proportion, size and minor details without departing from the spirit or sacrificing any of the advantages of the invention.

In the drawings,

Figure 1 is a front elevation of a base embodying the features of the present invention and showing the lower portions of a pair of vertical filing cases supported thereon.

Fig. 2 is a plan view of the base of the present invention.

Fig. 3 is an enlarged detail sectional view taken on the line 3—3 of Fig. 2, with a portion of a filing cabinet supported thereon.

Fig. 4 is a detail plan section on the line 4—4 of Fig. 3.

Fig. 5 is a detail sectional view taken on the line 5—5 of Fig. 4.

Fig. 6 is a detail plan section on the line 6—6 of Fig. 3.

Fig. 7 is a detail plan section on the line 7—7 of Fig. 1.

Fig. 8 is a fragmentary perspective view of a base embodying the features of the present invention.

Fig. 9 is a detail perspective view of one of the legs.

Fig. 10 is a detail perspective view of one of the cross bars or tie bars.

Fig. 11 is a detail perspective view of one of the filler clips.

The base of the present invention is rectangular in shape, square or oblong, according to the shape of the filing cabinet or other piece of furniture to be supported thereby. A base for the support of a single unit includes four leg members 1, duplicate longitudinal side bars 2, and duplicate cross bars or ties 3, one at the front and the other at the back of the structure. Each of the parts of the base is formed up from sheet metal, thereby to form a strong, durable and fireproof structure.

Each longitudinal side member 2 is in the form of a channel with the side flanges extending downwardly, and carrying a leg 1 at each end thereof. Each leg is in the form of a channel which is tapered downwardly and has the adjacent end of the side member 2 received between the sides of the leg and suitably connected thereto, preferably by spot-welding. The top of the side member 2 is flush with the top of the leg. The end of the side bar 2 terminates short of what will be termed the outer side of the leg, and the opposite sides of the leg are provided with alined slots 4 which intersect the top of the leg, thereby providing a space or seat between the end of the side member 2 and the outer side of the leg. For the purpose of stiffening and bracing the leg, there is a reinforcement 5 spot-welded to the inner face of the outer side of the leg so as to lie flat against the lower portion of the latter. The lower end portion of the reinforcement 5 is bent at substantially right angles thereto to form a bottom member 6. The upper portion of the reinforcement 5 is offset, as at 7, so as to produce a space between the parts 7 and the outer side of the leg, as best illustrated in Fig. 3 of the drawings. The top end of the offset portion 7 is disposed at substantially right angles thereto and spot-welded against the underside of the back of the member 2. Within the bottom of the leg there is a substantially U-shaped brace or filler 9, best shown in Figs. 3 and 8 of the drawings. This filler is spot-welded to the sides of the leg and to the part 6 of the reinforcement 5. The parts 6 and 9 are provided with registered threaded openings to receive the threaded shank 10 of a foot 11, which is preferably convex at its lower end and provided with a polygonal annular portion 12 constituting a wrench seat for convenience in turning the foot to adjust the latter vertically, whereby the foot may be adjusted to level the base. Two such side bars 2 carrying legs at opposite ends thereof are included in the base of the present invention, and are connected by the front and rear cross bars or tie bars 3, which are duplicates in construction, and therefore a detailed description of one of them will be sufficient.

The cross bar or tie 3 is illustrated in detail in Fig. 10 of the drawing, and consists of a straight flat bar bent to form an inwardly-directed substantially horizontal longitudinal flange 13 which terminates short of each end of the bar. The blank, from which the bar is constructed, is folded inwardly at the top to form a double thickness, as at 14, and is then bent inwardly to form an upper longitudinal substantially horizontal flange 15 extending throughout the length of the bar and terminating flush with the ends thereof. A depending projection 16 is provided at each end of the bar and depends therefrom at the inner face of the bar and across the adjacent end of the flange 13. This projection is in the form of an angle, the upper member of which is offset, as at 17, and spot-welded against the back of the bar and lying between the flanges 13 and 15. By this offset, the depending projection 16 is spaced from the rear face of the bar, and is received in the seat or recess provided between the end of the side bar 2 and the outer side of the leg member 1, as best shown in Figs. 3 and 4 of the drawings. When the tie bar or cross bar 3 is driven down into its normal position, the top of the outer side of the leg 1 is received between the projection 16 and the front of the bar 3, as clearly shown in Fig. 3 of the drawings, the edge of the projection 16 passing down below the bottom of the slot 4 of the leg until the top flange 15 rests upon the top of the side bar 2, in which position the bar 3 is locked against endwise movement upon the leg.

By this assemblage of parts at the four corners of the frame, the latter is conveniently and rigidly secured together without the employment of extraneous fastening means.

After the frame has thus been assembled, it will have the appearance shown in Fig. 8 of the drawings, and a filing cabinet or the like, shown at 18, may be placed upon the top of the base and between the upstanding flange portions 14 of the front and rear cross bars 3, the weight of the filing case or cabinet being sufficient to hold all of the parts of the base down in their normal interengaged position.

Metal filing cases or cabinets, for which the present base is primarily designed, have detachable ends which project slightly, say one sixteenth of an inch in front of the cabinet, a portion of such an end member being shown at 19 in Figs. 1 and 3 of the drawings, the outer face of such end member 19 being substantially flush with the outer face of the cross bar or tie 3, whereby there will be a space between the bottom of said end member 19 and the bottom of the cross bar 3. To fill up this space and thereby give the device a more finished appearance, there is provided a filler clip 20 which is substantially U-shaped so as to embrace the front of the leg and fit into one of the slots 4, said filler clip having a depending projection 21 which extends down into the space between the end of the bar 2 and the outer side of the leg, whereby the outer or front side of the clip effectually fills up said space and presents a flush surface at the extremity of the cross bar or tie 3.

When two upright filing cabinets or the like are to be supported alongside of one another, it requires only one additional side member 2 and two additional cross ties or bars 3, as clearly shown in Figs. 1 and 2 of the drawings, whereby the base may be conveniently extended to twice its width. It will therefore be understood that the base may be extended indefinitely in a very convenient and satisfactory manner. When making additions, the filler clip 20, at the side on which the extension is to be made, is removed so as to accommodate the depending projections 16 on the additional cross bar, as will be readily understood by reference to Fig. 1 of the drawings.

Fig. 1 of the drawings shows the downward taper of the legs, and also the bevel or downward taper of the projections 16, which therefore wedge within the legs and produce a tight fit for the purpose of avoiding looseness.

What we claim and desire to secure by Letters Patent is:

1. A base for filing cabinets and the like comprising side bars, cross bars and legs, each leg embracing one end of a side bar and having its outer side spaced from the end of the side bar to form a seat, and each cross bar being provided with depending projections detachably received in the seats.

2. A base for filing cabinets and the like comprising side bars, cross bars and legs, each leg being substantially U-shaped in cross section and embracing one end of a side bar, the outer side of the leg being spaced from the end of the side bar to form a seat, the adjacent cross bar lying in front of the leg and provided with depending projections engaging the seats and a substantially horizontal flange resting on the tops of the side bars.

3. A base for filing cabinets and the like comprising side bars, cross bars and legs, each leg being substantially U-shaped in cross section and embracing an end of the side bar, the outer side of the leg being spaced in front of the side bar to form a seat, another side of the leg having a slot communicating with the seat, each cross bar lying across the front of the leg and provided with projections lying in the seats and extending below the bottom of the slot in the leg.

4. A base for filing cabinets and the like comprising side bars, cross bars and legs, each leg being substantially U-shaped in cross section and embracing an end of a side bar, the outer side of the leg being spaced from the side bar to form a seat, each cross bar having a pair of substantially horizontal flanges, the upper flange resting upon the top of a side bar, the lower flange abutting the leg, the front of the cross bar lying across the front of the leg, each cross bar being provided at each end with a depending projection secured to the cross bar between the flanges and offset from the cross bar, said projection being removably located in the seat.

5. A base for filing cabinets and the like comprising side bars, cross bars and legs, each leg being substantially U-shaped in cross section and embracing an end of a side bar, the outer side of the leg being spaced from the end of the side bar to form a seat, each cross bar lying across a portion of the leg and provided with a depending projection lying in the seat, and a substantially U-shaped filler clip embracing the outer side of the leg and filling the space from the end of the cross bar to the side of the leg.

6. A base for filing cabinets and the like comprising side bars, cross bars and legs, each leg being substantially U-shaped in cross section and embracing an end of a side bar, the outer side of the leg being spaced from the end of the side bar to form a seat, each cross bar lying across a portion of the leg and provided with a depending projection lying in the seat, and a substantially U-shaped filler clip embracing the outer side of the leg and filling the space from the end of the cross bar to the side of the leg, said clip being provided with a depending projection lying in the said seat.

7. A base for filing cabinets and the like comprising side bars, cross bars and legs, each leg being substantially U-shaped in cross section and embracing an end of a side bar, one side of the leg being spaced from the end of the side bar to form a seat, each cross bar having a depending projection lying in one of the seats, and a reinforcement within each leg, the lower portion of the reinforcement being secured to the leg, the upper portion of the reinforcement being offset to accommodate the projection, and the top of the reinforcement being secured to the side bar.

RAYMOND G. BULLOCK.
GEORGE ANDERSON.